United States Patent
Fu

(10) Patent No.: US 10,712,747 B2
(45) Date of Patent: Jul. 14, 2020

(54) DATA PROCESSING METHOD, APPARATUS AND TERMINAL

(71) Applicant: Tencent Technology (Shenzhen) Company Limited, Shenzhen (CN)

(72) Inventor: Yujin Fu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 293 days.

(21) Appl. No.: 15/946,621

(22) Filed: Apr. 5, 2018

(65) Prior Publication Data

US 2018/0224863 A1 Aug. 9, 2018

Related U.S. Application Data

(63) Continuation-in-part of application No. PCT/CN2016/112671, filed on Dec. 28, 2016.

(30) Foreign Application Priority Data

Jan. 18, 2016 (CN) .......................... 2016 1 0031452

(51) Int. Cl.
*G05D 1/02* (2020.01)
*G01C 21/32* (2006.01)
(Continued)

(52) U.S. Cl.
CPC ........... *G05D 1/0248* (2013.01); *G01C 21/18* (2013.01); *G01C 21/32* (2013.01);
(Continued)

(58) Field of Classification Search
CPC ...... G05D 1/0248; G05D 1/027; G01C 21/32; G01C 21/3602; G01C 21/18; G06T 7/11; G06T 7/73; G06T 7/30; G06K 9/00798
See application file for complete search history.

(56) References Cited

U.S. PATENT DOCUMENTS

| 7,346,190 B2 | 3/2008 | Taniguchi et al. |
| 2010/0121561 A1 | 5/2010 | Kodaira et al. |

FOREIGN PATENT DOCUMENTS

| CN | 104063499 A | 9/2014 |
| CN | 104766058 A | 7/2015 |

(Continued)

OTHER PUBLICATIONS

Machine Translation of CN 104766058 retrieved from Espacenet on Mar. 16, 2020. (Year: 2015).*

(Continued)

*Primary Examiner* — Thomas Ingram
(74) *Attorney, Agent, or Firm* — Morgan, Lewis & Bockius LLP

(57) ABSTRACT

At a computing system comprising one or more processors and memory, the computing system is attached to a moving vehicle traveling along a road: collecting road data while the computing system is in motion, the road data comprising a two-dimensional streetscape image, a three-dimensional point cloud, and inertial navigation data; performing region segmentation on the two-dimensional streetscape image; extracting a ground region image based on a spatial position relation of the two-dimensional streetscape image, the three-dimensional point cloud, and the inertial navigation data; detecting at least one target road traffic marking in the ground region image; and controlling motion of the moving vehicle in accordance with three-dimensional coordinates of the at least one target road traffic marking that are calculated based on the spatial position relation of the two-dimensional streetscape image, the three-dimensional point cloud, and the inertial navigation data.

15 Claims, 9 Drawing Sheets

(51) Int. Cl.
*G01C 21/36* (2006.01)
*G06T 7/11* (2017.01)
*G06T 7/73* (2017.01)
*G01C 21/18* (2006.01)
*G06K 9/00* (2006.01)

(52) U.S. Cl.
CPC ......... *G01C 21/3602* (2013.01); *G05D 1/027* (2013.01); *G06K 9/00798* (2013.01); *G06T 7/11* (2017.01); *G06T 7/73* (2017.01); *G05D 2201/0213* (2013.01); *G06T 2207/10024* (2013.01); *G06T 2207/10028* (2013.01); *G06T 2207/30256* (2013.01)

(56) References Cited

FOREIGN PATENT DOCUMENTS

| CN | 104899858 A | 9/2015 |
|---|---|---|
| CN | 105719284 A | 6/2016 |
| EP | 2282295 A1 | 2/2011 |
| EP | 2320382 A1 | 5/2011 |
| EP | 2874097 A3 * | 7/2015 ......... G06K 9/00201 |
| JP | 2008187347 A | 8/2008 |
| JP | 2009266003 A | 11/2009 |
| JP | WO 2008099915 A1 | 5/2010 |
| JP | 2011233165 A | 11/2011 |

OTHER PUBLICATIONS

Tencent Technology, ISR, PCT/CN2016/112671, Apr. 10, 2017, 2 pgs.
Tencent Technology, Written Opinion, PCT/CN2016/112671, dated Apr. 10, 2017, 5 pgs.
Tencent Technology, IPRP, PCT/CN2016/112671, Jul. 31, 2018, 6 pgs.

* cited by examiner

3(e)

3(f)

DATA PROCESSING METHOD, APPARATUS AND TERMINAL

PRIORITY CLAIM AND RELATED APPLICATION

This application is a continuation-in-part application of PCT/CN2016/112671, entitled "INFORMATION PROCESSING METHOD, DEVICE, AND TERMINAL" filed on Dec. 28, 2016, which claims priority to Chinese Patent Application No. 201610031452.5, filed with the State Intellectual Property Office of the People's Republic of China on Jan. 18, 2016, and entitled "INFORMATION PROCESSING METHOD, DEVICE, AND TERMINAL", all of which are incorporated herein by reference in their entirety.

TECHNICAL FIELD

This application relates to the field of computer technologies, specifically to the technical field of road data processing, and in particular, to a street image processing method, a street image processing apparatus, and a terminal.

BACKGROUND

In existing fields of car navigation, vehicle automatic driving, and driving safety tips, the most basic and important technology is a detecting technology about road traffic markings, such as lane lines and road signs. Currently, mainstream technical solutions mainly include the following two kinds. One solution is a detecting method based on changes of ground reflectivity: reflectivity of the road traffic markings is generally higher than reflectivity of other parts of a road surface. Therefore, a three-dimensional point cloud of a road scene space may first be obtained, and then the road traffic markings are extracted manually from the three-dimensional point cloud according to this feature. Because the solution directly detects and extracts the road traffic markings from the three-dimensional point cloud, a detecting result may be affected if a point cloud of the three-dimensional point cloud is sparse, occluded, missing, etc. Moreover, accuracy of the detecting result may be directly affected if the ground reflectivity turns out to be weak or uneven. The other solution is a manual detecting method: obtain a two-dimensional streetscape image and the three-dimensional point cloud of the road scene space, and use the two-dimensional streetscape image to apply colors to the three-dimensional point cloud, so as to generate a colorful point cloud, and then manually extract the road traffic markings from the colorful point cloud according to the two-dimensional streetscape image. The solution still directly extracts the road traffic markings from the three-dimensional point cloud, so it may be possible that the detecting result may be affected if the point cloud of the three-dimensional point cloud is sparse, occluded, missing, etc. Furthermore, manual detection is impractical and of low efficiency, easily causing mistakes.

SUMMARY

Embodiments of this application provide a data processing method, apparatus, and a terminal. By detecting road traffic markings in a two-dimensional streetscape image, accuracy of a detecting result and practicability of data processing may be improved.

A first aspect of the embodiments of this application provides a data processing method, which may include:

at a computing system comprising one or more processors and memory, the computing system is attached to a moving vehicle traveling along a road:

collecting road data while the computing system is in motion, the road data including a two-dimensional streetscape image, a three-dimensional point cloud, and inertial navigation data;

performing region segmentation on the two-dimensional streetscape image and extracting a ground region image based on a spatial position relation of the two-dimensional streetscape image, the three-dimensional point cloud, and the inertial navigation data;

detecting at least one target road traffic marking in the ground region image, the road traffic marking including a lane line and/or a road sign;

controlling motion of the moving vehicle in accordance with three-dimensional coordinates of the at least one target road traffic marking that are calculated based on the spatial position relation of the two-dimensional streetscape image, the three-dimensional point cloud, and the inertial navigation data.

Preferably, performing region segmentation on the two-dimensional streetscape image and extracting a ground region image based on a spatial position relation of the two-dimensional streetscape image, the three-dimensional point cloud, and the inertial navigation data includes:

establishing a coordinate system of an inertial navigation of a three-dimensional space according to the inertial navigation data;

registering the three-dimensional point cloud and the two-dimensional streetscape image in the three-dimensional space based on the coordinate system of the inertial navigation;

performing, by a registered three-dimensional point cloud, the region segmentation on the two-dimensional streetscape image and extracting the ground region image.

Preferably, the detecting at least one target road traffic marking in the ground region image includes:

performing binary processing to the ground region image to obtain a binary ground region image;

performing orthographic projection transformation to the binary ground region image to generate a ground orthographic projection image;

extracting at least one road traffic marking from the ground orthographic projection image.

Preferably, the extracting at least one road traffic marking from the ground orthographic projection image includes:

extracting at least one first road traffic marking from the ground orthographic projection image and extracting an interference image by using an image recognition method;

regarding the interference image as a binary mask to filter the ground orthographic projection image;

extracting at least one second road traffic marking from the filtered ground orthographic projection image by using the image recognition method; and combining the first road traffic marking and the second road traffic marking that are extracted to obtain at least one target road traffic marking.

Preferably, the calculating three-dimensional coordinates of the at least one target road traffic marking based on the spatial position relation of the two-dimensional streetscape image, the three-dimensional point cloud, and the inertial navigation data includes:

obtaining morphological data of the ground orthographic projection image in the coordinate system of the inertial navigation, where the morphological data includes position data and posture data;

finding the three-dimensional coordinates of the at least one target road traffic marking according to the morphological data.

A system comprising one or more processors and memory that includes instructions which when executed by the one or more processors, cause the processors to perform the method set forth herein is also disclosed. A non-transitory computer-readable storage medium storing instructions, the instructions, when executed by the one or more processors, cause the processors to perform the method set forth herein is also disclosed.

By implementing the embodiments of this application, the following beneficial effects are obtained:

In the embodiments of this application, after collecting a two-dimensional streetscape image, a three-dimensional point cloud, and inertial navigation data, performing region segmentation on the two-dimensional streetscape image and extracting a ground region image by using the three-dimensional point cloud and the inertial navigation data, and detecting at least one target road traffic marking in the ground region image and inversing three-dimensional coordinates of the target road traffic marking. It may be avoided that a detecting result is affected if a point cloud of the three-dimensional point cloud is sparse, occluded, missing, or something, because the road traffic marking is detected and obtained from the two-dimensional streetscape image rather than the three-dimensional point cloud. In addition, by accurately performing region segmentation on, detecting, and extracting the two-dimensional streetscape image by using the inertial navigation data and the three-dimensional point cloud, accuracy of the detecting result and practicability of data processing may be effectively improved.

BRIEF DESCRIPTION OF THE DRAWINGS

To illustrate the technical solutions in the embodiments of the present application or in the prior art more clearly, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

The technical solutions in the embodiments of the present application are clearly described in the following with reference to the accompanying drawings. Apparently, the embodiments to be described are merely a part rather than all of the embodiments of the present application. All other embodiments obtained by persons of ordinary skill in the art based on the embodiments of the present invention without creative efforts shall fall within the protection scope of the present invention.

In the embodiments of this application, after collecting a two-dimensional streetscape image, a three-dimensional point cloud, and inertial navigation data, performing region segmentation on the two-dimensional streetscape image and extracting a ground region image by using the three-dimensional point cloud and the inertial navigation data, and detecting at least one target road traffic marking in the ground region image and inversing three-dimensional coordinates of the target road traffic marking, so as to reach a purpose of improving accuracy of a detecting result and practicability of data processing.

Figure 1:
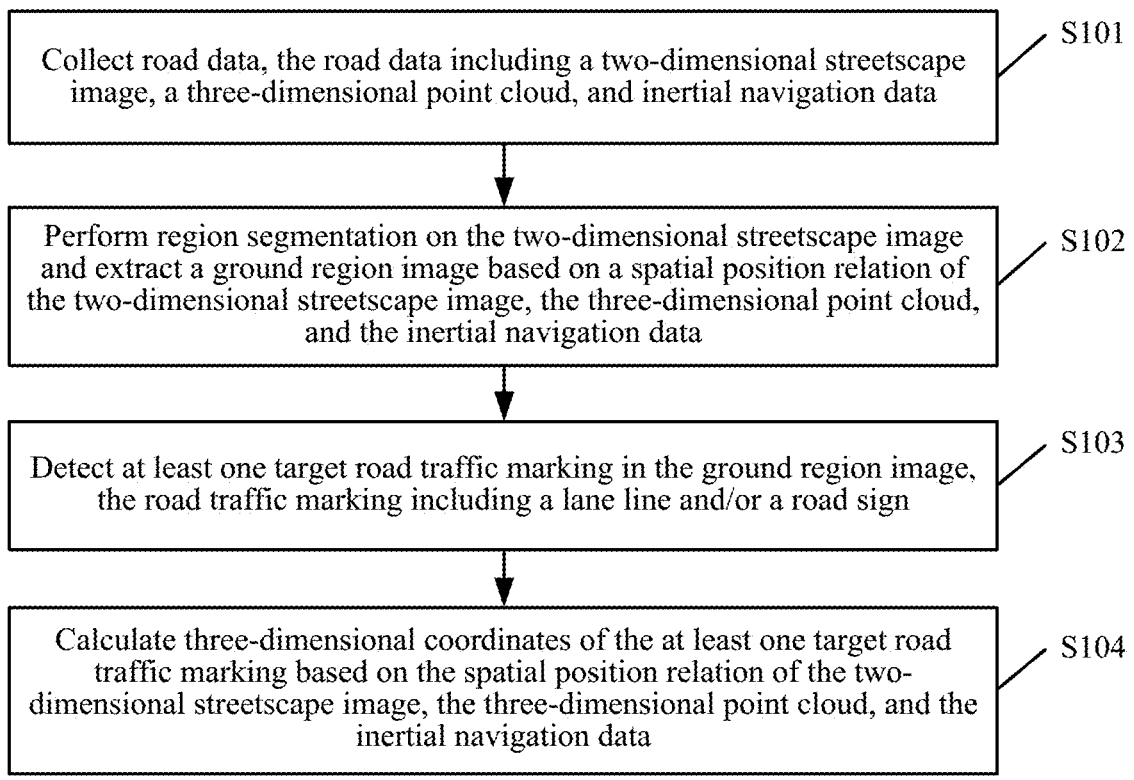
FIG. 1 is a flowchart of a data processing method according to an embodiment of this application.

Based on the foregoing principle, the embodiments of this application provide a data processing method. As shown in FIG. 1, the method includes the following step S101-step S104.

S101: Collect road data, the road data including a two-dimensional streetscape image, a three-dimensional point cloud, and inertial navigation data.

The two-dimensional streetscape image may be obtained by using camera equipment such as cameras and camera lenses to shoot a road while the vehicle is in motion, approaching an intersection, and/or when the vehicle is stopped at a stop light or stop sign. The two-dimensional streetscape image usually includes an image portion of a ground region and an image portion of a non-ground region, where the image of the ground region may describe data such as road surface conditions, road traffic markings, running vehicles on the road, and isolation strips of the road. The image of the non-ground region may describe buildings, plants around the road, and so on. Furthermore, the road traffic markings refer to signs such as lines, words, arrows, object markings, road studs, and delineators, used to transmit traffic information of guidance, limitations, warnings, and so on. The road traffic markings include, but are not limited to: lane lines and/or road signs; where the road signs include, but are not limited to: a steering sign, a deceleration sign, a forbidden zone sign, and so on. The three-dimensional point cloud may be obtained by means of a laser scanner. The laser scanner may scan multiple space points in a scanning range to obtain three-dimensional coordinates of each point in space in the field of view of the camera, and form the three-dimensional point cloud with reference to laser pulse strength corresponding to each space point. The inertial navigation data may be obtained by using an inertial navigation system (Inertial Navigation System, INS) and an inertial measurement unit (Inertial Measurement Unit, IMU) to scan. Specifically, the INS may obtain global positioning system (Global Positioning System, GPS) data of a scanning position of the laser scanner, and carrier running data including a speed, an acceleration, and so on of the vehicle carrying the camera, laser scanner, and the INS; the IMU may obtain rolling, pitching, and yawing data of the carrier (e.g., the vehicle in motion).

S102: Perform region segmentation on the two-dimensional streetscape image and extract a ground region image based on a spatial position relation of the two-dimensional streetscape image, the three-dimensional point cloud, and the inertial navigation data.

In the embodiments of this application, the two-dimensional streetscape image, the three-dimensional point cloud, and the inertial navigation data that are collected all come from a same scene space and at the same time. Therefore, the region segmentation may be performed on the two-dimensional streetscape image based on the spatial position relation of the three and by using the three-dimensional point cloud. In a specific implementation, when the method performs step S102, the method specifically performs the following steps s11-s13:

s11: Establish a coordinate system of an inertial navigation of a three-dimensional space according to the inertial navigation data.

INS is an automatic navigation system that does not depend on external information or radiate energy to the outside. IMU is an apparatus used to measure a three-axis attitude angle (or an angular rate) and an acceleration of an object. The INS and the IMU both include a gyroscope and an accelerometer, where the gyroscope forms a coordinate system of the inertial navigation, making a measuring axis of the accelerometer steadily form a course and an attitude angle in the coordinate system of the inertial navigation. The accelerometer is used to measure the acceleration when a carrier runs, and obtain the inertial navigation data of the carrier, such as a speed, a displacement, rolling, and pitching by using a series of calculations and transformations. Therefore, the coordinate system of the inertial navigation used in the three-dimensional space may be inversely calculated according to collected inertial navigation data, the coordinate system of the inertial navigation being position reference of the three-dimensional space in a scanning process.

s12: Register the three-dimensional point cloud and the two-dimensional streetscape image in the three-dimensional space based on the coordinate system of the inertial navigation;

Regarding the coordinate system of the inertial navigation as position reference, registering the three-dimensional point cloud and the two-dimensional streetscape image in the three-dimensional space. In a specific implementation, a certain three-dimensional point $P(x_i, y_i, z_i)$ in a scene space is obtained by using a laser scanner, where the three-dimensional point $P(x_i, y_i, z_i)$ may obtain a certain two-dimensional point $P'(x_j, y_j)$ in the two-dimensional streetscape image after imaging by camera equipment. A purpose of registering is to find all matched three-dimensional points $P(x_i, y_i, z_i)$ and two-dimensional points $P'(x_j, y_j)$ from the three-dimensional point cloud and the two-dimensional streetscape image.

s13: Perform, by a registered three-dimensional point cloud, the region segmentation on the two-dimensional streetscape image and extract the ground region image.

After registering the three-dimensional point cloud and the two-dimensional streetscape image in the three-dimensional space, the region segmentation on the two-dimensional streetscape image are conveniently implemented by using the three-dimensional point cloud. Each point in the three-dimensional point cloud is represented by three-dimensional coordinates (x, y, z), so the region segmentation may be intuitively performed to the three-dimensional space according to values of x, y, and z. For example, if a value of a z axis of the three-dimensional point in a ground region is zero, a spatial region constructed with all three-dimensional points whose values of z axes are zero in the three-dimensional point cloud is a ground spatial region; similarly, if a value of a z axis of the three-dimensional point in a target spatial region is a preset value, a spatial region constructed by extracting all three-dimensional points whose values of z axes are the preset value in the three-dimensional point cloud is the target spatial region. Based on this, the step may use the three-dimensional coordinates of each point in the three-dimensional point cloud to perform the region segmentation on the three-dimensional space, and find all two-dimensional points registering with each three-dimensional point in the ground spatial region. A region image constructed with the two-dimensional points in the two-dimensional streetscape image is the ground region image.

Figure 2A:
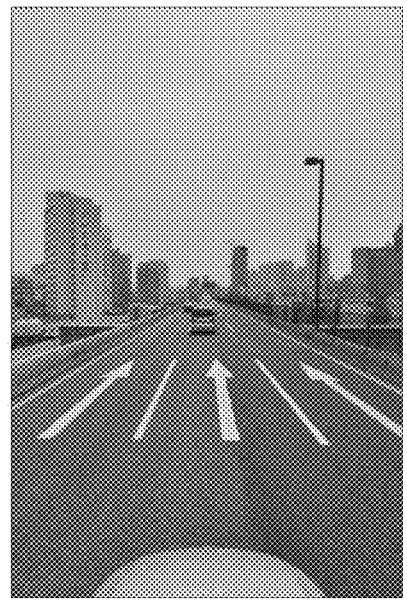
FIG. 2a is a schematic diagram of a two-dimensional streetscape image according to an embodiment of this application.
Figure 2B:
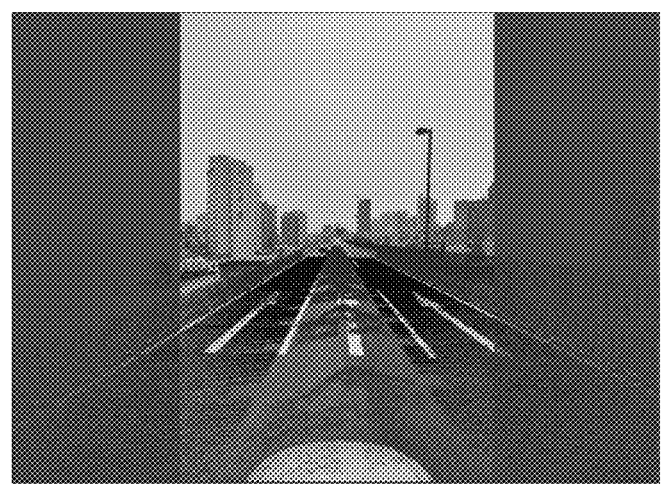
FIG. 2b is a schematic diagram of registering a two-dimensional streetscape image and a three-dimensional point cloud according to an embodiment of this application.
Figure 2C:
FIG. 2c is a schematic diagram of a ground region image according to an embodiment of this application.

Aiming at the foregoing steps s11-s13 and with reference to FIG. 2a-FIG. 2c, FIG. 2a shows collected two-dimensional streetscape image. In step s12, after registering the two-dimensional streetscape image shown in FIG. 2a with the three-dimensional point cloud based on the coordinate system of the inertial navigation, an image shown in FIG. 2a may be formed. The ground region image shown in FIG. 2c may be obtained after performing the region segmentation, as in s13, to an image shown in FIG. 2b.

S103: Detect at least one target road traffic marking in the ground region image, the road traffic marking including a lane line and/or a road sign.

Figure 2D:
FIG. 2d is a schematic diagram of a binary ground region image according to an embodiment of this application.

During shooting the two-dimensional streetscape image, a shooting manner of the ground region image is usually non-orthographic: camera equipment and a road surface are basically in a head-up range, that is, an imaging axis of the camera equipment is not vertical to the ground, but has a certain angle, and the angle in the coordinate system of the inertial navigation represents a yaw angle and/or a pitch angle of the camera equipment. The depth of field of the ground region image obtained in a non-orthographic manner is relatively far with gradual transition from the near to the distant, which provides a basis for extracting the road traffic marking. However, the non-orthographic manner may deform the road traffic marking in the ground region image, increasing difficulty of detection. Based on this, the step needs to process the ground region image during detection, when the method performs step S103, the method specifically performs the following steps s21-s23:

s21: Perform binary processing to the ground region image to obtain a binary ground region image (e.g., as shown in FIG. 2d).

Generally, the collected two-dimensional streetscape image is a colorful image, and the ground region image extracted from the two-dimensional streetscape image is also a colorful image, while the road traffic marking is white. To make the road traffic marking in the ground region image more clear and more easy to detect, the binary processing needs to be performed to the colorful ground region image in the step, so as to obtain a binary ground region image.

s22: Perform orthographic projection transformation to the binary ground region image to generate a ground orthographic projection image (e.g., as shown in FIG. 3e).

A purpose of the orthographic projection transformation is to adjust a direction of an optical axis of the ground region image to be vertical; specifically, the binary ground region image may be projected to a ground spatial region described by the three-dimensional point cloud to generate the ground orthographic projection image.

s23: Extract at least one road traffic marking from the ground orthographic projection image.

The ground orthographic projection image clearly presents road traffic markings, such as lane lines and road signs, so that the at least one road traffic marking may be recognized and extracted by using image reorganization; in a specific implementation, a method of Hough transform (Hough Transform) may be used to recognize the lane lines in the ground orthographic projection image and a method of module matching may be used to recognize the road signs in the ground orthographic projection image.

Figure 2E:
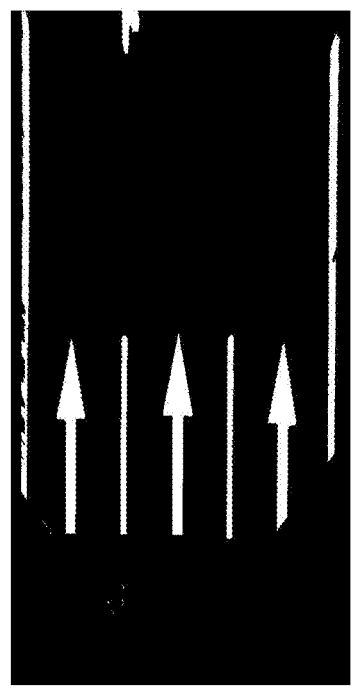
FIG. 2e is a schematic diagram of a ground orthographic projection image according to an embodiment of this application.

Aiming at the foregoing steps s21-s23 and with reference to FIG. 2d-FIG. 2e, the binary ground region image shown in FIG. 2d may be obtained aimed at the extracted ground region image shown in FIG. 2c after the binary processing in step s21. The ground orthographic projection shown in FIG. 2e may be obtained after the orthographic projection transformation is performed in step s21 to the binary ground region image shown in FIG. 2d. The at least one road traffic marking may be extracted from the ground orthographic projection shown in FIG. 2d by using the image reorganization.

Figure 3A:
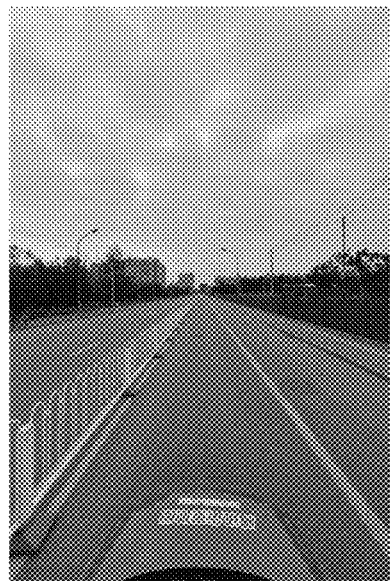
FIGS. 3A-3B, including subparts 3a-3f, are a schematic diagram of a process flow for removing interfering objects from the streetscape image according to an embodiment of the application.
Figure 3A:
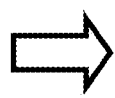
Figure 3A:
Figure 3A:
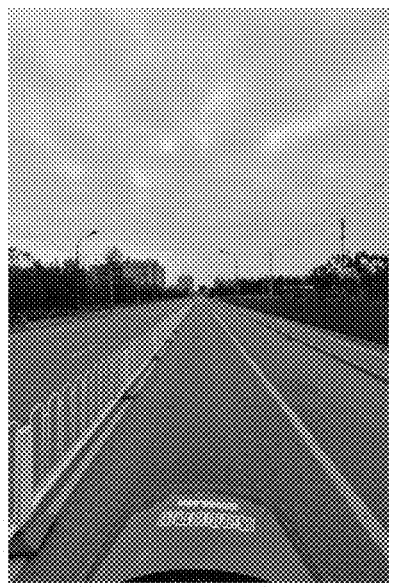
Figure 3A:
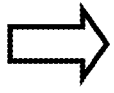
Figure 3A:
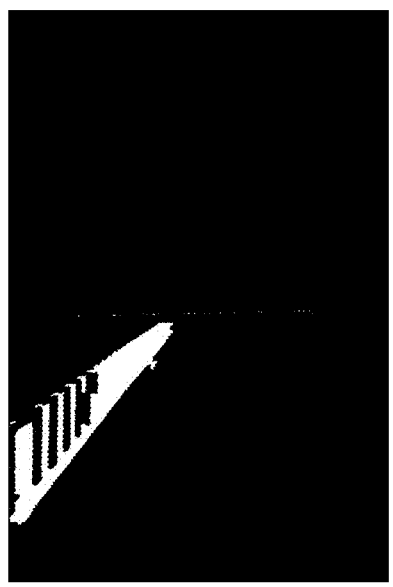
Figure 3B:
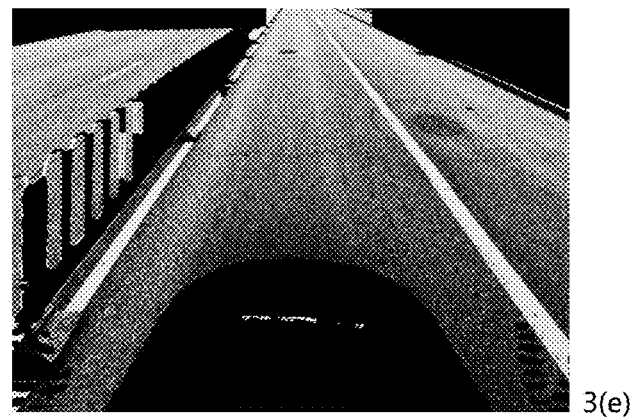
Figure 3B:
Figure 3B:
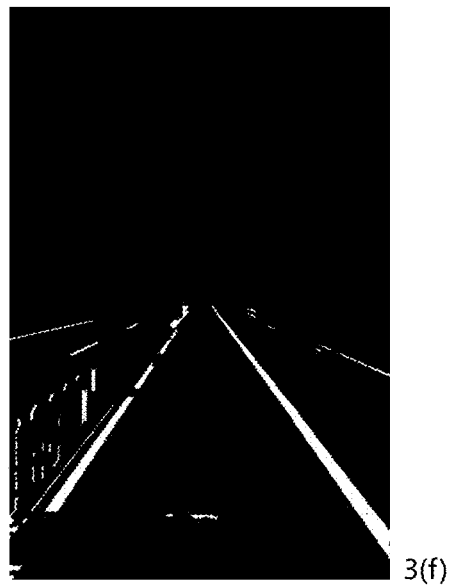

In practical application, there are always interferences, such as running vehicles, isolation belts, and road stains in the ground region image. Therefore, interference images exist in the binary ground orthographic projection image, and the interference images may affect a detecting result of the road traffic marking. As shown in FIG. 3(a)-3(b), there are two lane dividers that define the lane that the vehicle is in, however, the binary ground image includes pixels that correspond to the center divider fence, and making the lane divider near the center divider fence difficult to recognize. To resolve the problem, the method according to the embodiments of this application specifically performs the following steps s231-s234 when the method performs step s23:

s231: Extract at least one first road traffic marking from the ground orthographic projection image and extract an interference image by using an image recognition method (e.g., any object recognition method based on machine vision, neural network, statistical method, binarization and thresholding method, etc.). The original image shown in FIG. 3(c) is processed in accordance with the above method to obtain the ground orthographic projection image, and to obtain at least one first road traffic marking (e.g., lane divider on the right side portion of the image) from the ground orthographic projection image. The road traffic marking close to the center divider fence could not be extracted clearly due to the presence of the center divider fence, as shown in the image shown in FIG. 3(b). An interference image shown in FIG. 3(d) is extracted from the original image 3(c), e.g., using an object/image recognition method. The method can be the same as that used to obtain the first road traffic marking, but with different parameters. The interference image includes pixels that do not correspond to road traffic marking (e.g., pixels that correspond to the metal fence center divider).

s232: Regard the interference image as a binary mask to re-act on the ground orthographic projection image. For example, the image in FIG. 3(d) is used as a mask for the image in FIG. 3(b), such that the pixels corresponding to the traffic marking near the center divider fence remain in the image, while the pixels that correspond to the center divider fence and other interference objects are removed from the image. FIG. 3B shows that, the re-acted ground image with the pixels of the center divider fence removed.

s233: Extract at least one second road traffic marking from a re-acted ground orthographic projection image by using the image recognition method. For example, the road marking next to the center divider is recognized based on the pixels that remain in the re-acted ground orthographic projection image which correspond to the traffic marking near the center divider fence remain in the image.

s234: Combine the first road traffic marking and the second road traffic marking that are extracted to obtain at least one target road traffic marking. As shown in FIG. 3(e), the both lane dividers are recognized in the image.

Step s231-step s234 show that influence of the interference may be removed and accuracy of the detecting result of the road traffic marking may be improved by secondly extracting the road traffic marking; specifically, first extracting the road traffic marking for once from the ground orthographic projection image, at the same time extracting an interference image as a binary mask to react on the ground orthographic projection image; the interference image in the ground orthographic projection image may be removed by reaction, and extracting the road traffic marking for another time from the ground orthographic projection image to combine two road traffic markings. It should be noted that to remove the influence of the interference, a second extracting manner is not limited, for example, a third or more times extracting may be used to combine multi-extracted road traffic markings. Compared with the second extracting, the third or more times extracting may remove the influence of the interference more thoroughly at a cost of low efficiency, so selection in a specific implementation may be made according to actual needs.

S104: Calculate three-dimensional coordinates of the at least one target road traffic marking based on the spatial position relation of the two-dimensional streetscape image, the three-dimensional point cloud, and the inertial navigation data.

In a specific implementation, when the method performs step S104, the method specifically performs the following steps s31-s32:

s31: Obtain morphological data of the ground orthographic projection image in the coordinate system of the inertial navigation, where the morphological data includes position data and posture data.

s32: Find the three-dimensional coordinates of the at least one target road traffic marking according to the morphological data.

In the foregoing steps s31-s32, position data and posture data of the ground orthographic projection image in the coordinate system of the inertial navigation may be obtained based on the spatial position relation of the two-dimensional streetscape image, the three-dimensional point cloud, and the inertial navigation data because the ground orthographic projection image comes from the two-dimensional streetscape image. The three-dimensional coordinates of the road traffic marking may be inversed by using the position data and the posture data of the ground orthographic projection image in the coordinate system of the inertial navigation.

The embodiments of this application provide a data processing method. After collecting a two-dimensional streetscape image, a three-dimensional point cloud, and inertial navigation data, performing region segmentation on the two-dimensional streetscape image and extracting a ground region image by using the three-dimensional point cloud and the inertial navigation data, and detecting at least one target road traffic marking in the ground region image and inversing three-dimensional coordinates of the target road traffic marking. It may be avoided that a detecting result is affected if a point cloud of the three-dimensional point cloud is sparse, occluded, missing, or something, because the road traffic marking is detected and obtained from the two-dimensional streetscape image rather than the three-dimensional point cloud. In addition, by accurately performing region segmentation on, detecting, and extracting the two-dimensional streetscape image by using the inertial navigation data and the three-dimensional point cloud, accuracy of the detecting result and practicability of data processing may be effectively improved.

As disclosed herein, the advanced driver assistance system (ADAS) can be installed on a vehicle, and utilize various types of sensors available on the vehicle to collect the surrounding environment data, and identify objects in the surroundings, tracking and following moving objects in the surroundings, and alert the driver of potential danger on the road, and/or automatically adjust control of the vehicle to avoid danger on the road.

The vehicle moves on a street, the vehicle collects 2 dimensional images of the streetscape using a camera (e.g., a camera installed on the front of the vehicle and/or on the top of the vehicle). In addition, the vehicle collects point cloud data using specialized equipment which includes light sensors and laser scanners. The laser scanner scans the space in front of the vehicle using laser beams, and collect reflection data which reflects the distance and shapes of objects in front of the vehicle (e.g., ground, road surface, other vehicles, buildings, road signs, reflective road markings, etc.). The two dimensional streetscape data and the three-dimensional point cloud data are taking concurrently, and can be correlated with one another. The point cloud data is used to segment out the road surface from the two-dimensional streetscape image. The pixel data in the two-dimensional streetscape image are projected into the three-dimensional point cloud of the space in front of the vehicle. Specifically, the road surface image in the two-dimensional streetscape image is transformed into an orthographic projection image and road and traffic markings are extracted from the orthographic projection image based on the features extracted from orthographic projection image. In the end, based on the position of the road and traffic markings in the orthographic image, the actual three-dimensional coordinates of the road and traffic markings are derived in a three-dimensional coordinate system of the vehicle.

Figure 4:
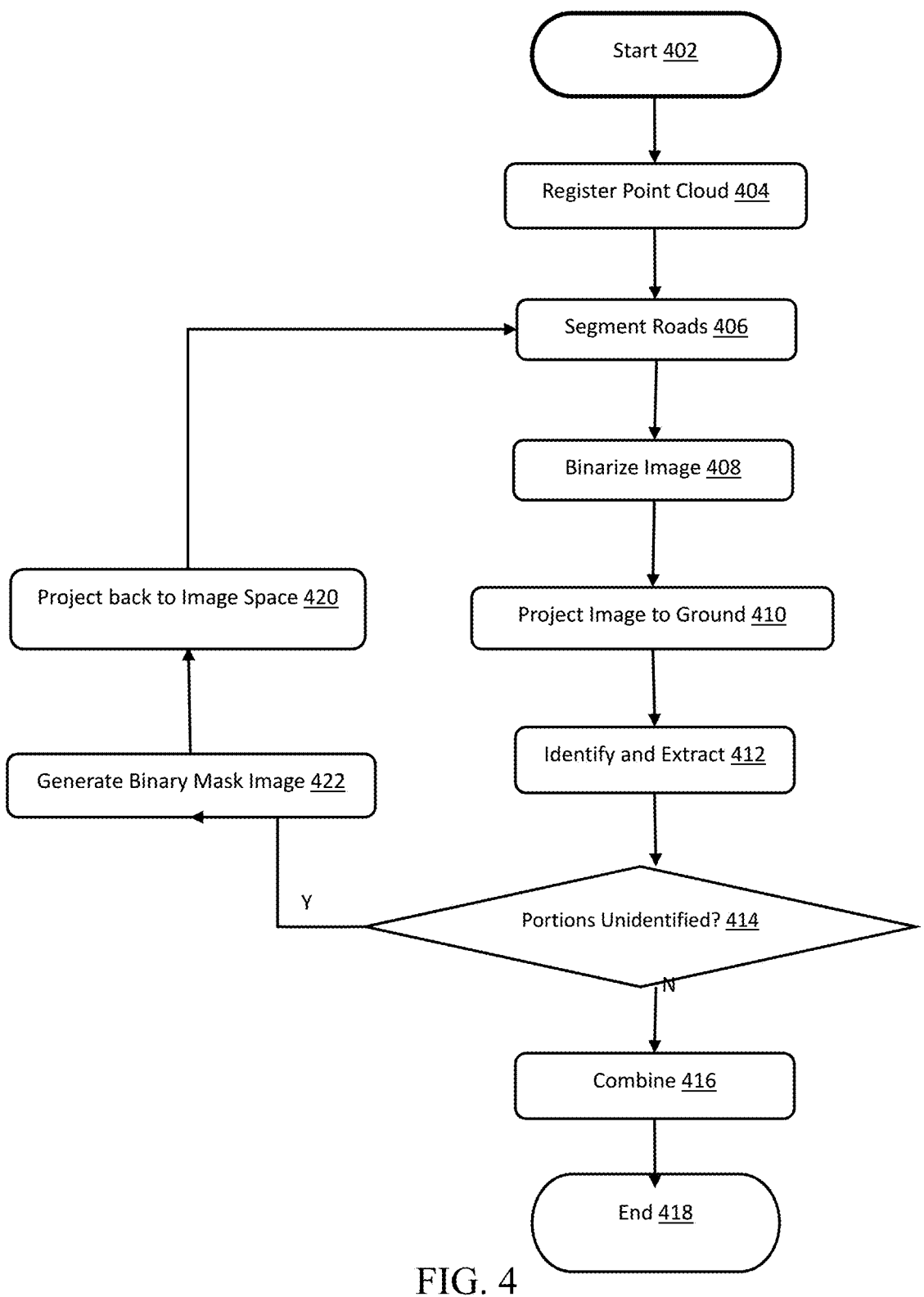
FIG. 4 is a flowchart of a street image processing method according to an embodiment of this application.

FIG. 4 is an exemplary process flow for getting the traffic markings and removing interferences described above. In the process flow, the process starts (402) with registering (404) the three dimensional point cloud data with the two-dimensional streetscape image taken at the same time. Then, segmentation (406) of the road traffic markings is performed. The image is binarized (408). The image is projected to the ground surface and orthographic projection of the road surface is obtained (410). The road marking is extracted from the orthographic projection of the road surface (412). If there are portions of the image that is unrecognized (414), an interference image is generated and a binarized mask is created based on the interference image (422), and the interference image is used as a mask to process the image to remove the interfering pixels. The processed image undergoes the process to identify road marking again (420). In the end, when all markings are identified, and there are no more unrecognized portions in the image, the recognized road markings are combined (416). The process ends (418).

Figure 5:
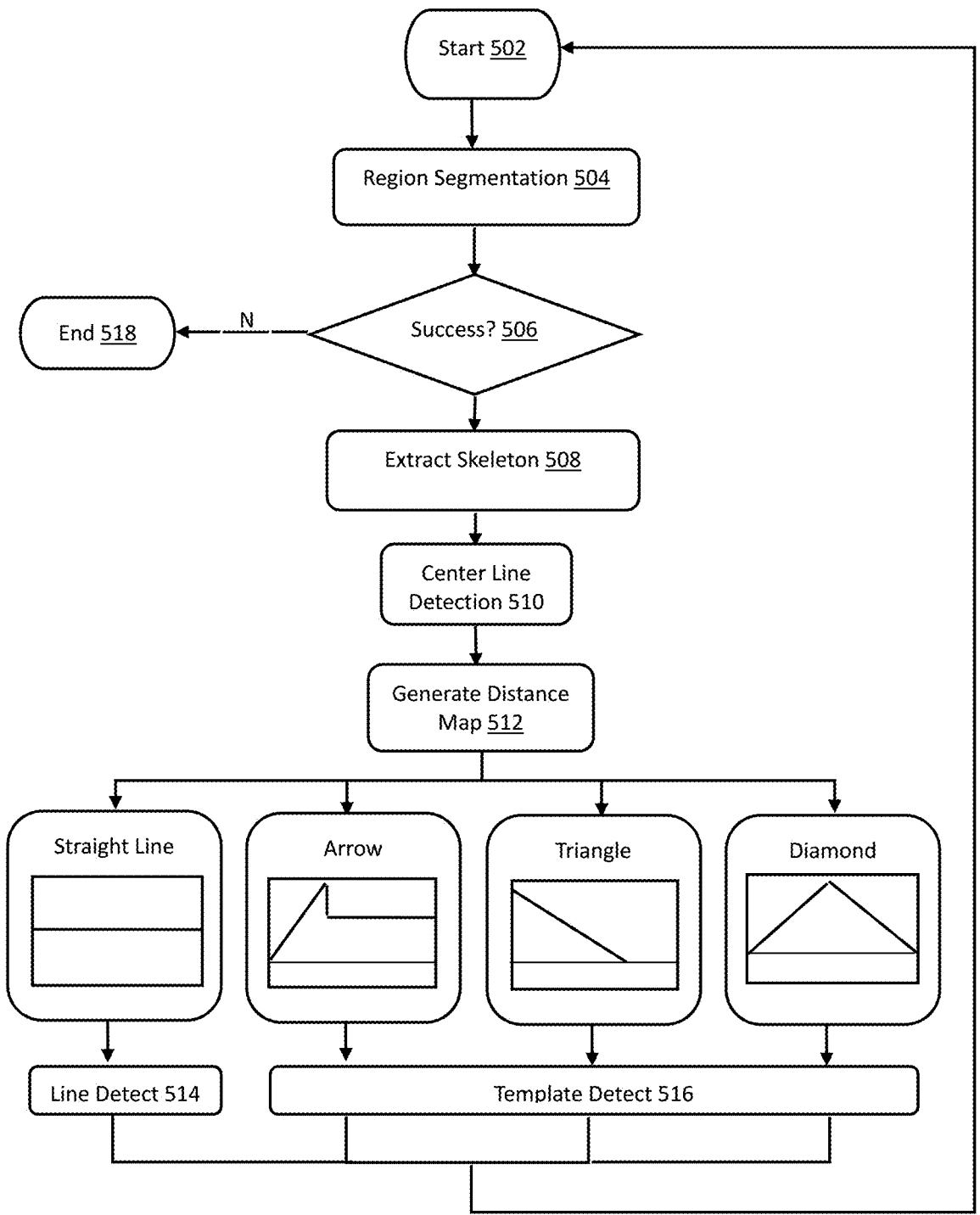
FIG. 5 is a flowchart of a street image processing method according to an embodiment of this application.

FIG. 5 shows an exemplary process for extracting a road marking from the orthographic projection image. The process begins (502). Region segmentation is performed (504). If segmentation is successful (506), skeleton of the road markings are extracted (508), otherwise, the process ends (518). After the skeleton of the road markings are extracted, center line detection is performed (510). Orthographic projection distance map is generated (512). Line detection (514) and pattern recognition based on templates of road markings (516) are performed. The process restarts when additional images are acquired.

Figure 6:
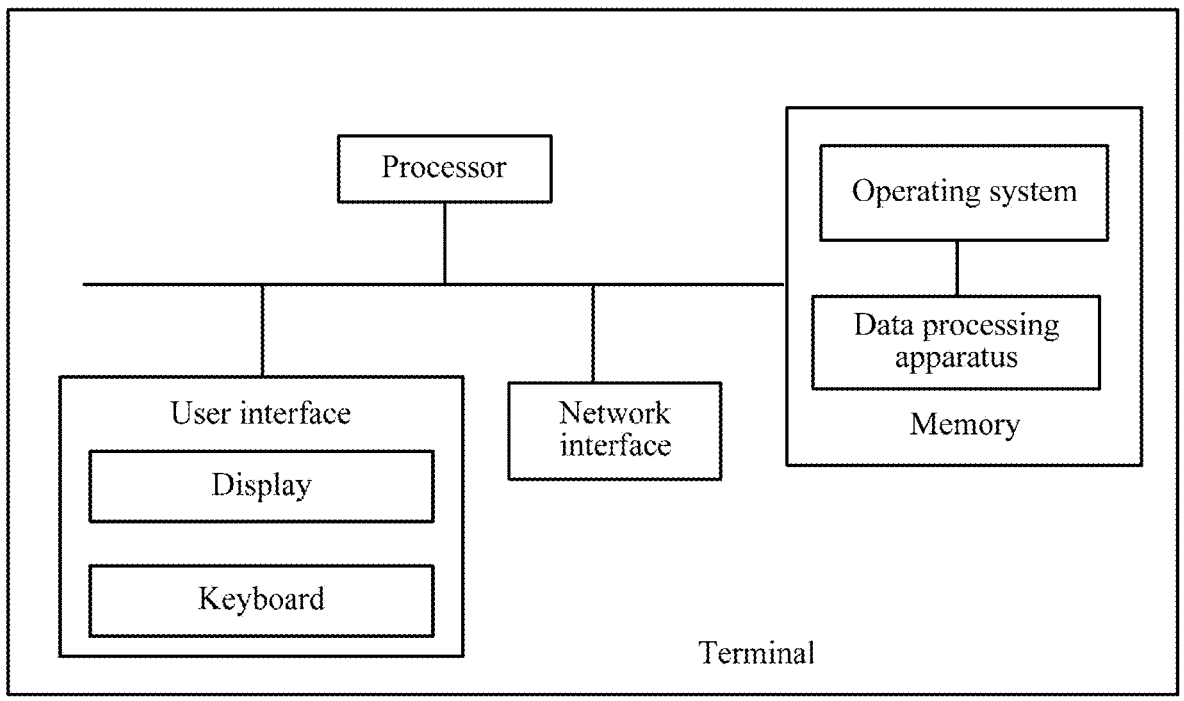
FIG. 6 is a schematic structural diagram of a terminal according to an embodiment of this application.

Embodiments of this application provide a terminal, including devices such as laptops, phones, pads (PAD), and vehicle terminals. Referring to FIG. 6, an internal structure of the terminal may include, but is not limited to: a processor, a user interface, a network interface, and a memory. The processor, the user interface, the network interface, and the memory in the terminal may be connected with a bus or in other way. In FIG. 6 of the embodiments of this application, take a bus connection as an example.

Figure 7:
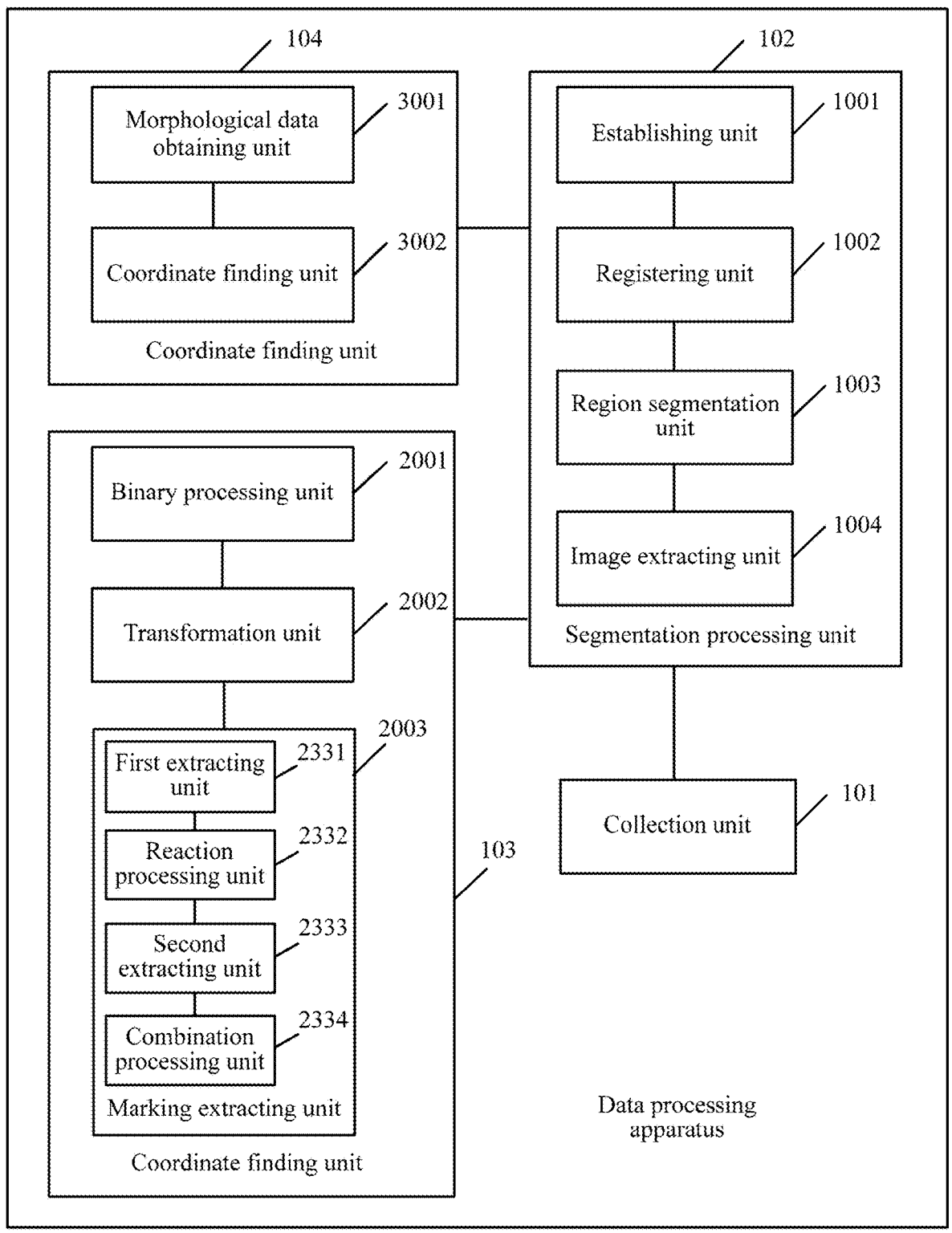
FIG. 7 is a schematic structural diagram of a data processing apparatus according to an embodiment of this application.

The user interface is an interaction and information exchange medium between a user and a terminal, specifically including a display (Display) used to output, a keyboard (Keyboard) used to input, and so on. It should be noted that the keyboard here may be a physical keyboard, or a touch-screen virtual keyboard, or a physical and touch-screen virtual keyboard. The processor (or central processing unit (CPU)) is a calculation core and a control core of the terminal, which can analyze instructions in the terminal and data of a processing terminal, for example, the CPU may be used to analyze an on/off instruction sent by the user to the terminal, and control the terminal perform on/off operations; for another example, the CPU may transmit interaction data between internal structures of the terminal, and the like. The memory (Memory) is a memory device in the terminal, used for storing programs and data. It should be understood that the memory here may include an internal memory of the terminal, and may also include an expanded memory supported by the terminal. The memory provides a storage space, storing an operating system of the terminal. In the embodiments of this application, the storage space of the memory also stores a data processing apparatus. The terminal performs corresponding steps of a method procedure shown in the foregoing FIGS. 1-5 by sunning the data processing apparatus in the memory. Referring to FIG. 7, the data processing apparatus performs the following units:

a collection unit 101, configured to collect road data, the road data including a two-dimensional streetscape, a three-dimensional point cloud, and inertial navigation data.

a segmentation processing unit 102, configured to perform region segmentation on the two-dimensional streetscape image and extract a ground region image based on a spatial position relation of the two-dimensional streetscape image, the three-dimensional point cloud, and the inertial navigation data.

a detection unit 103, configured to detect at least one target road traffic marking in the ground region image, the road traffic marking including a lane line and/or a road sign.

a calculation unit 104, configured to calculate three-dimensional coordinates of the at least one target road traffic marking based on the spatial position relation of the two-dimensional streetscape image, the three-dimensional point cloud, and the inertial navigation data.

In a specific implementation, when the device operates the segmentation processing unit 102, the device specifically operates the following units:

an establishing unit 1001, configured to establish a coordinate system of an inertial navigation of a three-dimensional space according to the inertial navigation data.

an registering unit 1002, configured to register the three-dimensional point cloud and the two-dimensional streetscape image in the three-dimensional space based on the coordinate system of the inertial navigation.

a region segmentation unit 1003, configured to perform, by a registered three-dimensional point cloud, the region segmentation on the two-dimensional streetscape image.

an image extracting unit 1004, configured to extract the ground region image.

In a specific implementation, when the device operates the detection unit 103, the device specifically operates the following units:

a binary processing unit 2001, configured to perform binary processing to the ground region image to obtain a binary ground region image.

a transformation unit 2002, configured to perform orthographic projection transformation to the binary ground region image to generate a ground orthographic projection image.

a marking extracting unit 2003, configured to extract at least one road traffic marking from the ground orthographic projection image.

In a specific implementation, when the device operates the marking extracting unit 2003, the device specifically operates the following units:

a first extracting unit 2331, configured to extract at least one first road traffic marking from the ground orthographic projection image and extract an interference image by using an image recognition method.

a reaction processing unit 2332, configured to regard the interference image as a binary mask to react on the ground orthographic projection image.

a second extracting unit 2333, configured to extract at least one second road traffic marking from a reacted ground orthographic projection image by using the image recognition method.

a combination processing unit 2334, configured to combine the first road traffic marking and the second road traffic marking that are extracted to obtain at least one target road traffic marking.

In a specific implementation, when the device operates the calculation unit 104, the device specifically operates the following units:

a morphological data obtaining unit 3001, configured to obtain morphological data of the ground orthographic projection image in the coordinate system of the inertial navigation, where the morphological data includes position data and posture data.

a coordinate finding unit 3002, configured to find the three-dimensional coordinates of the at least one target road traffic marking according to the morphological data.

The data processing method shown in FIGS. 1-5 may be performed by every unit in the data processing apparatus shown in FIG. 7 according to an embodiment of this application. For example, step S101, S102, S103, and S104 shown in FIG. 1 may be separately performed by the collection unit 101, the segmentation processing unit 102, the detection unit 103, and calculation unit 104 shown in FIG. 7; step s11, s12, and s13 may be separately performed by the establishing unit 1001, the registering unit 1002, the region segmentation unit 1003, and the image extracting unit 1004 shown in FIG. 7; step s21, s22, and s23 may be separately performed by the binary processing unit 2001, the transformation unit 2002, and the marking extracting unit 2003 shown in FIG. 7; step s231, s232, s233, and s234 may be separately performed by the first extracting unit 2331, the reaction processing unit 2332, the second extracting unit 2333, and the combination processing unit 2334 shown in FIG. 7; step s31 and s32 may be separately performed by the morphological data obtaining unit 3001 and the coordinate finding unit 3002 shown in FIG. 7.

According to another embodiment of this application, units of the system for data processing apparatus shown in FIG. 7 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by multiple units, or functions of multiple units are implemented by one unit. In other embodiments of this application, the terminal device may include other modules. However, in an actual application, these functions may also be cooperatively implemented by another unit and may be cooperatively implemented by multiple units.

According to another embodiment of this application, a data processing apparatus shown in FIG. 7 may be constructed and a data processing method may be implemented according to the embodiments of this application by running a computer program (including program code) that can perform the data processing method shown in FIG. 1 on processing elements and memory elements including a central processing unit (CPU), a random access memory (RAM), a read-only memory (ROM), and so on, for example, generic computing devices of computers. The computer program may be recorded in, for example, a computer readable recording medium, and may be loaded into the foregoing computing device by using the computer readable recording medium, and run in the computing device.

Being same with the method, the embodiments of this application provide a data processing apparatus. After collecting a two-dimensional streetscape image, a three-dimensional point cloud, and inertial navigation data, performing region segmentation on the two-dimensional streetscape image and extracting a ground region image by using the three-dimensional point cloud and the inertial navigation data, and detecting at least one target road traffic marking in the ground region image and inversing three-dimensional coordinates of the target road traffic marking. It may be avoided that a detecting result is affected if a point cloud of the three-dimensional point cloud is sparse, occluded, missing, or something, because the road traffic marking is detected and obtained from the two-dimensional streetscape image rather than the three-dimensional point cloud. In addition, by accurately performing region segmentation on, detecting, and extracting the two-dimensional streetscape image by using the inertial navigation data and the three-dimensional point cloud, accuracy of the detecting result and practicability of data processing may be effectively improved.

It should be understood that each part of this application may be implemented by using hardware, software, firmware, or their combination. In the foregoing implementations, multiple steps or methods may be implemented by using the software or firmware that are stored in a memory and executed by an appropriate instruction execution system. For example, if using the hardware to implement, as same as in another implementation, any one of the following technologies known in the field or their combination may be used to implement: a discrete logical circuit of a logical gating circuit used to implement a logic function for a digital signal, an appropriate specified integrated circuit of a combinational logical gating circuit, a programmable gate array (PGA), a field programmable gate array (FPGA), and so on.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. In addition, functional units in the embodiments of the present application may be integrated into one processing module, or each of the units may exist alone physically, or two or more units are integrated into one module. The integrated modules may be implemented in the form of hardware or software functional modules. If implemented in the form of software functional modules and sold or used as an independent product, the integrated modules may also be stored in a computer-readable storage medium. The storage medium may be a magnetic disk, an optical disc, a read-only memory (Read-Only Memory, ROM) or a random access memory (Random Access Memory, RAM), or the like.

What is disclosed above is merely exemplary embodiments of this application, and certainly is not intended to limit the protection scope of this application. Therefore, equivalent variations made in accordance with the claims of this application shall fall within the scope of this application.

What is claimed is:

1. A method, comprising:
   at a computing system comprising one or more processors and memory, the computing system is attached to a moving vehicle traveling along a road:
   collecting road data while the computing system is in motion, the road data comprising a two-dimensional streetscape image, a three-dimensional point cloud, and inertial navigation data;
   performing region segmentation on the two-dimensional streetscape image;
   extracting a ground region image based on a spatial position relation of the two-dimensional streetscape image, the three-dimensional point cloud, and the inertial navigation data;
   detecting at least one target road traffic marking in the ground region image; and
   controlling motion of the moving vehicle in accordance with three-dimensional coordinates of the at least one target road traffic marking that are calculated based on the spatial position relation of the two-dimensional streetscape image, the three-dimensional point cloud, and the inertial navigation data.

2. The method according to claim 1, wherein performing region segmentation on the two-dimensional streetscape image comprises:
   establishing a coordinate system of an inertial navigation of a three-dimensional space according to the inertial navigation data;
   registering the three-dimensional point cloud and the two-dimensional streetscape image in the three-dimensional space based on the coordinate system of the inertial navigation;
   performing, by a registered three-dimensional point cloud, the region segmentation on the two-dimensional streetscape image.

3. The method according to claim 1, wherein the detecting at least one target road traffic marking in the ground region image comprises:
   performing binary processing to the ground region image to obtain a binary ground region image;
   performing orthographic projection transformation to the binary ground region image to generate a ground orthographic projection image; and
   extracting the at least one road traffic marking from the ground orthographic projection image.

4. The method according to claim 3, wherein extracting the at least one road traffic marking from the ground orthographic projection image comprises:
   extracting at least one first road traffic marking from the ground orthographic projection image;
   extracting an interference image from the ground orthographic projection image by using an image recognition method;
   using the interference image as a binary mask to filter the ground orthographic projection image;
   extracting at least one second road traffic marking from the filtered ground orthographic projection image; and
   combining the first road traffic marking and the second road traffic marking that are extracted to obtain the at least one target road traffic marking.

5. The method according to claim 3, wherein calculating three-dimensional coordinates of the at least one target road traffic marking based on the spatial position relation of the two-dimensional streetscape image, the three-dimensional point cloud, and the inertial navigation data comprises:
   obtaining morphological data of the ground orthographic projection image in the coordinate system of the inertial navigation, wherein the morphological data comprises position data and posture data; and
   finding the three-dimensional coordinates of the at least one target road traffic marking according to the morphological data.

6. A non-transitory computer-readable storage medium storing instructions, the instructions, when executed by one or more processors of at a computing system that is attached to a moving vehicle traveling along a road, cause the processors to perform operations comprising:
   collecting road data while the computing system is in motion, the road data comprising a two-dimensional streetscape image, a three-dimensional point cloud, and inertial navigation data;
   performing region segmentation on the two-dimensional streetscape image;
   extracting a ground region image based on a spatial position relation of the two-dimensional streetscape image, the three-dimensional point cloud, and the inertial navigation data;
   detecting at least one target road traffic marking in the ground region image; and
   controlling motion of the moving vehicle in accordance with three-dimensional coordinates of the at least one target road traffic marking that are calculated based on the spatial position relation of the two-dimensional streetscape image, the three-dimensional point cloud, and the inertial navigation data.

7. The computer-readable storage medium according to claim 6, wherein performing region segmentation on the two-dimensional streetscape image comprises:
  establishing a coordinate system of an inertial navigation of a three-dimensional space according to the inertial navigation data;
  registering the three-dimensional point cloud and the two-dimensional streetscape image in the three-dimensional space based on the coordinate system of the inertial navigation;
  performing, by a registered three-dimensional point cloud, the region segmentation on the two-dimensional streetscape image.

8. The computer-readable storage medium according to claim 6, wherein the detecting at least one target road traffic marking in the ground region image comprises:
  performing binary processing to the ground region image to obtain a binary ground region image;
  performing orthographic projection transformation to the binary ground region image to generate a ground orthographic projection image; and
  extracting the at least one road traffic marking from the ground orthographic projection image.

9. The computer-readable storage medium according to claim 8, wherein extracting the at least one road traffic marking from the ground orthographic projection image comprises:
  extracting at least one first road traffic marking from the ground orthographic projection image;
  extracting an interference image from the ground orthographic projection image by using an image recognition method;
  using the interference image as a binary mask to filter the ground orthographic projection image;
  extracting at least one second road traffic marking from the filtered ground orthographic projection image; and
  combining the first road traffic marking and the second road traffic marking that are extracted to obtain the at least one target road traffic marking.

10. The computer-readable storage medium according to claim 8, wherein calculating three-dimensional coordinates of the at least one target road traffic marking based on the spatial position relation of the two-dimensional streetscape image, the three-dimensional point cloud, and the inertial navigation data comprises:
  obtaining morphological data of the ground orthographic projection image in the coordinate system of the inertial navigation, wherein the morphological data comprises position data and posture data; and
  finding the three-dimensional coordinates of the at least one target road traffic marking according to the morphological data.

11. A computing system, comprising:
  one or more processors; and
  memory storing instructions, wherein:
    the computing system is attached to a moving vehicle traveling along a road, and the instructions, when executed by the one or more processors, cause the processors to perform operations comprising:
    collecting road data while the computing system is in motion, the road data comprising a two-dimensional streetscape image, a three-dimensional point cloud, and inertial navigation data;
    performing region segmentation on the two-dimensional streetscape image; extracting a ground region image based on a spatial position relation of the two-dimensional streetscape image, the three-dimensional point cloud, and the inertial navigation data;
    detecting at least one target road traffic marking in the ground region image; and
    controlling motion of the moving vehicle in accordance with three-dimensional coordinates of the at least one target road traffic marking that are calculated based on the spatial position relation of the two-dimensional streetscape image, the three-dimensional point cloud, and the inertial navigation data.

12. The computing system according to claim 11, wherein performing region segmentation on the two-dimensional streetscape image comprises:
  establishing a coordinate system of an inertial navigation of a three-dimensional space according to the inertial navigation data;
  registering the three-dimensional point cloud and the two-dimensional streetscape image in the three-dimensional space based on the coordinate system of the inertial navigation;
  performing, by a registered three-dimensional point cloud, the region segmentation on the two-dimensional streetscape image.

13. The computing system according to claim 11, wherein the detecting at least one target road traffic marking in the ground region image comprises:
  performing binary processing to the ground region image to obtain a binary ground region image;
  performing orthographic projection transformation to the binary ground region image to generate a ground orthographic projection image; and
  extracting the at least one road traffic marking from the ground orthographic projection image.

14. The computing system according to claim 13, wherein extracting the at least one road traffic marking from the ground orthographic projection image comprises:
  extracting at least one first road traffic marking from the ground orthographic projection image;
  extracting an interference image from the ground orthographic projection image by using an image recognition method;
  using the interference image as a binary mask to filter the ground orthographic projection image;
  extracting at least one second road traffic marking from the filtered ground orthographic projection image; and
  combining the first road traffic marking and the second road traffic marking that are extracted to obtain the at least one target road traffic marking.

15. The computing system according to claim 13, wherein calculating three-dimensional coordinates of the at least one target road traffic marking based on the spatial position relation of the two-dimensional streetscape image, the three-dimensional point cloud, and the inertial navigation data comprises:
  obtaining morphological data of the ground orthographic projection image in the coordinate system of the inertial navigation, wherein the morphological data comprises position data and posture data; and
  finding the three-dimensional coordinates of the at least one target road traffic marking according to the morphological data.

\* \* \* \* \*